United States Patent
Kong

(10) Patent No.: US 8,011,689 B2
(45) Date of Patent: Sep. 6, 2011

(54) AIRBAG APPARATUS FOR VEHICLES

(75) Inventor: Byung Seok Kong, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/548,165

(22) Filed: Aug. 26, 2009

(65) Prior Publication Data

US 2010/0133793 A1 Jun. 3, 2010

(30) Foreign Application Priority Data

Dec. 1, 2008 (KR) .................. 10-2008-0120702

(51) Int. Cl.
*B60R 21/205* (2011.01)

(52) U.S. Cl. .................................. 280/728.3

(58) Field of Classification Search ............... 280/728.3
See application file for complete search history.

(56) References Cited

U.S. PATENT DOCUMENTS

| | | | | |
|---|---|---|---|---|
| 5,108,128 A | * | 4/1992 | Parker et al. | 280/732 |
| 5,427,408 A | * | 6/1995 | Ando et al. | 280/728.3 |
| 5,447,327 A | * | 9/1995 | Jarboe et al. | 280/728.3 |
| 5,458,361 A | * | 10/1995 | Gajewski | 280/728.3 |
| 5,478,107 A | * | 12/1995 | Yamagishi et al. | 280/728.3 |
| RE36,003 E | * | 12/1998 | Sato | 280/728.3 |
| 5,915,724 A | * | 6/1999 | Daris et al. | 280/728.3 |
| 6,042,139 A | * | 3/2000 | Knox | 280/728.3 |
| 6,929,280 B2 | * | 8/2005 | Yasuda et al. | 280/728.2 |
| 7,007,970 B2 | * | 3/2006 | Yasuda et al. | 280/728.3 |
| 7,029,027 B2 | * | 4/2006 | Gray et al. | 280/728.3 |
| 7,210,700 B2 | * | 5/2007 | Zagrodnick | 280/728.3 |
| 7,354,061 B2 | * | 4/2008 | Yasuda et al. | 280/728.3 |
| 7,429,058 B2 | * | 9/2008 | Chen et al. | 280/728.3 |
| 7,490,850 B2 | * | 2/2009 | Kanno | 280/728.3 |
| 7,744,115 B2 | * | 6/2010 | Kanno | 280/728.3 |
| 7,784,820 B2 | * | 8/2010 | Mazzocchi et al. | 280/728.3 |
| 2006/0033313 A1 | * | 2/2006 | Horiyama | 280/728.3 |
| 2007/0080521 A1 | * | 4/2007 | Leserre et al. | 280/728.3 |
| 2007/0145728 A1 | * | 6/2007 | Sadano et al. | 280/732 |
| 2007/0200318 A1 | * | 8/2007 | Kamiya | 280/728.3 |
| 2008/0042406 A1 | * | 2/2008 | Evans | 280/728.3 |
| 2009/0045610 A1 | * | 2/2009 | Funakura | 280/728.3 |

* cited by examiner

*Primary Examiner* — Paul N Dickson
*Assistant Examiner* — Nicole Verley
(74) *Attorney, Agent, or Firm* — Morgan, Lewis & Bockius LLP

(57) ABSTRACT

Disclosed herein is an airbag apparatus for vehicles, which is capable of minimizing the loss of pressure of an airbag cushion. The airbag housing of the airbag apparatus accommodates an airbag cushion which is deployed through an opening. An airbag deployment door is placed to face the opening and separated from the cut notch of a crash pad cover when the airbag cushion is deployed. A chute is connected to a surface of the airbag deployment door through a curved hinge portion which is placed to be parallel to the sidewall of the airbag housing.

8 Claims, 7 Drawing Sheets

AIRBAG APPARATUS FOR VEHICLES

CROSS-REFERENCE TO RELATED APPLICATIONS

The present application claims priority to Korean Patent Application Number 10-2008-0120702 filed Dec. 1, 2008, the entire contents of which application is incorporated herein for all purpose by this reference.

BACKGROUND OF THE INVENTION

1. Field of the Invention

The present invention relates to an airbag apparatus for vehicles, which is capable of minimizing the loss of pressure of an airbag cushion.

2. Description of Related Art

Generally, an airbag apparatus for vehicles includes an airbag cushion, a housing for accommodating the airbag cushion therein and an inflator for inflating the airbag cushion.

As shown in FIG. 6, in a conventional airbag apparatus for vehicles, a door 12 is provided on an instrument panel 10 to enable the deployment of an airbag through a cut line 11. Further, a chute 14 is coupled to the instrument panel 10 through fusion, and a reaction plate 13 is coupled to the door 12 through fusion. The reaction plate 13 is fastened to a hinge plate 15 using a rivet.

Further, an airbag module 20 includes a housing 22 for accommodating an airbag cushion 21 therein, and an airbag module bracket 23 for supporting the housing 22. The airbag module bracket 23 and the hinge plate 15 are fastened to the chute 14 via a fastening member 16.

Particularly, when a crash occurs, the hinge plate 15 is subjected to the deploying pressure of the airbag cushion 21 as a result of the explosion of an inflator 24, and the deploying pressure of the hinge plate 15 is transmitted to the reaction plate 13 and the door 12. Here, the cut line 11 of the door 12 is broken by the expansion pressure, and the door 12, the reaction plate 13 and the hinge plate 15 rotate in one direction, so that the door 12 is opened.

The conventional airbag apparatus is problematic in that when a crash occurs, the deploying direction of the airbag cushion 21 is not identical with the hinge expanding direction of the hinge plate 15, as shown in FIGS. 7A to 7D, so that the expansion of the hinge is retarded, and the pressure of the airbag cushion is lost due to the for the expansion of the hinge.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag apparatus for vehicles, which allows the deploying direction of an airbag cushion to correspond to the hinge expanding direction of an airbag deployment door, thus mining the loss of pressure of the airbag cushion.

In one aspect of the present invention, the airbag apparatus for a vehicle, may include an airbag housing having an opening and retaining an airbag cushion therein, and through which the airbag cushion is configured to be deployed, an airbag deployment door placed to cover the opening, and separated from a crash pad cover when the airbag cushion is deployed, and a chute connected to a surface of the airbag deployment door through a curved hinge portion which is placed adjacent to a sidewall of the airbag housing.

The curved hinge portion may be formed in a creased shape, so that the curved hinge portion straightens in a forward direction of the opening when the airbag cushion is deployed, thus rotating the airbag deployment door to be approximately straight with a deploying direction of the airbag cushion, wherein the deploying direction of the airbag cushion is identical with an expanding direction of the curved hinge portion.

The chute may include a pad holding plate secured to a back portion of the crash pad cover, a door reinforcing plate secured to a back portion of the airbag deployment door, and a support plate alternately connected to the pad holding plate and the door reinforcing plate.

An insert hole may be formed at a predetermined position in the support plate such that at least portion of the airbag housing is inserted and secured to the insert hole.

A stopper may be provided on the pad holding plate such that a lateral end of the stopper is placed parallel to a cut notch, wherein the cut notch is formed in the back portion of the crash pad cover to be cut when the airbag cushion is deployed.

The chute may be integrated with the door reinforcing plate.

The support plate may surround at least a portion of the sidewall of the airbag housing.

In various aspects, the present invention allows the deploying direction of an airbag cushion to correspond to the hinge expanding direction of an airbag deployment door, thus realizing the rapid expansion of a hinge and minimizing the loss of airbag cushion pressure.

Furthermore a door reinforcing plate supporting the airbag deployment door of a crash pad cover may be integrated with a chute, thus reducing the number of parts and manufacturing cost.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
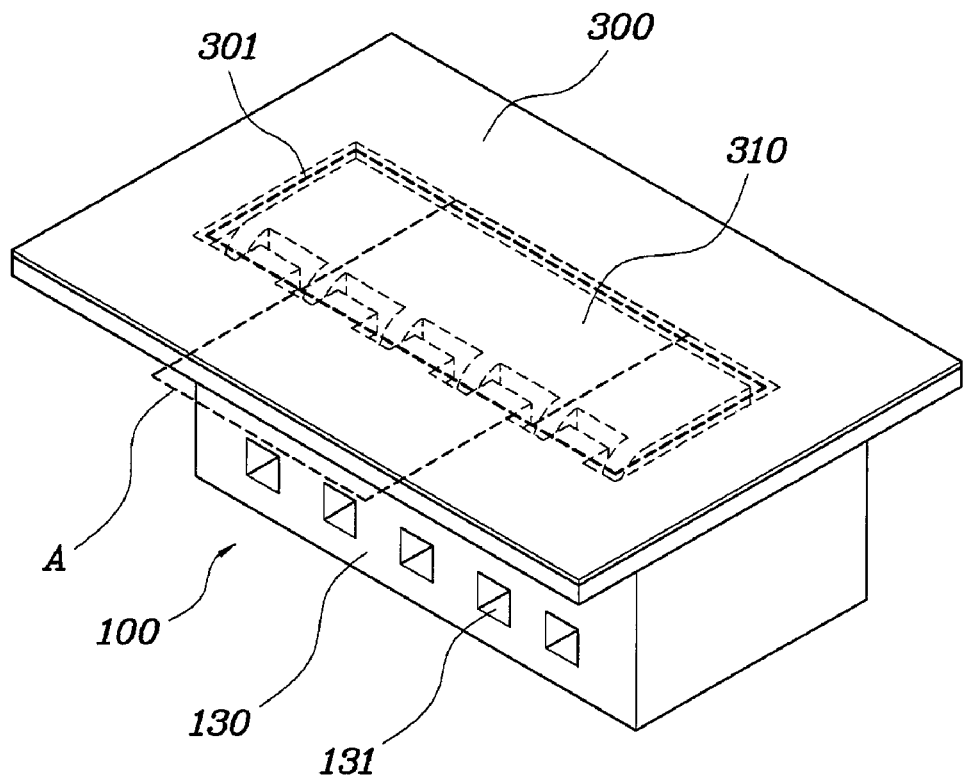
FIG. 1 is a view illustrating the construction of the chute of an exemplary airbag apparatus for vehicles according to the present invention.
Figure 2:
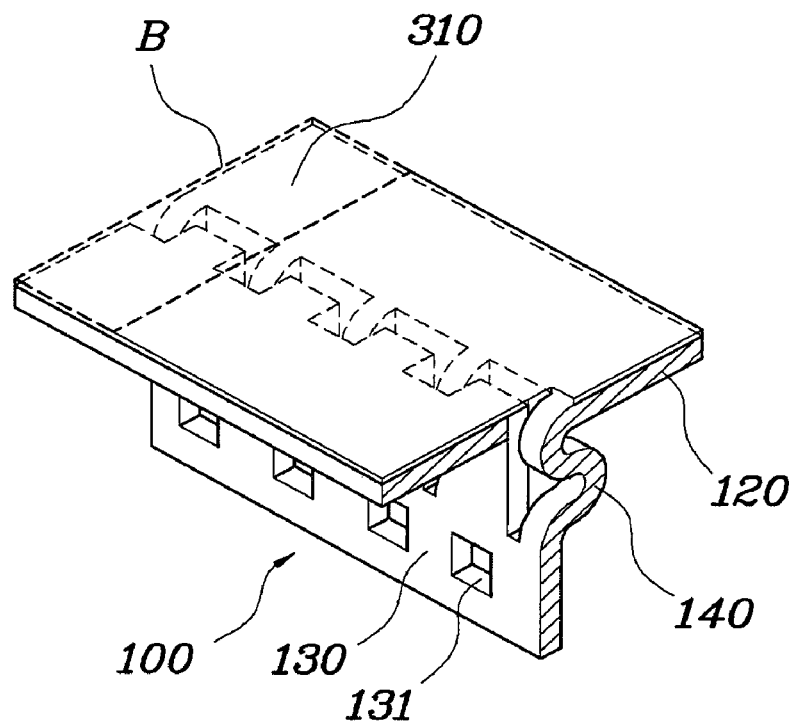
FIG. 2 is an enlarged view illustrating portion "A" of FIG. 1.
Figure 3:
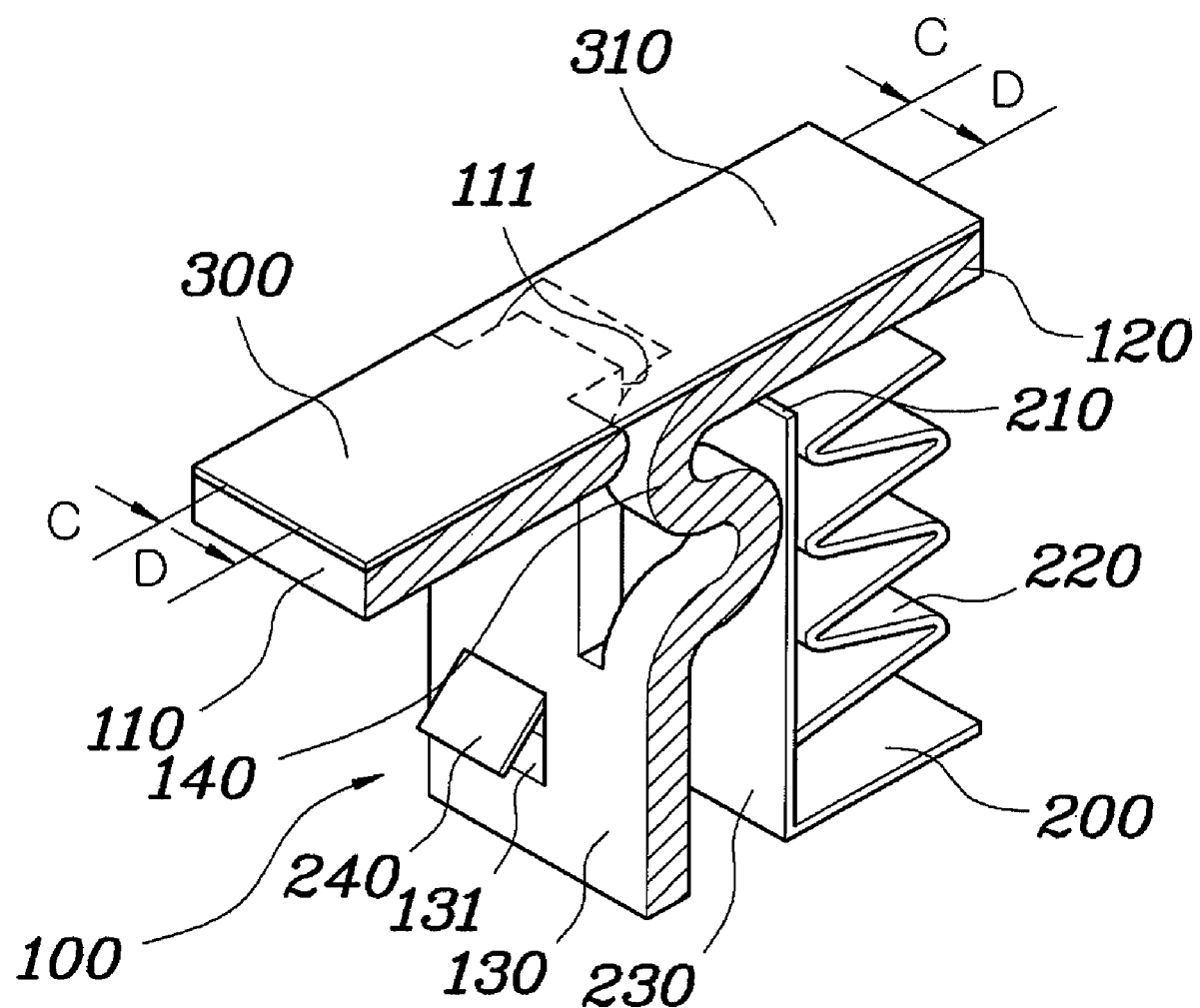
FIG. 3 is an enlarged view illustrating portion "B" of FIG. 2.
Figure 4A:
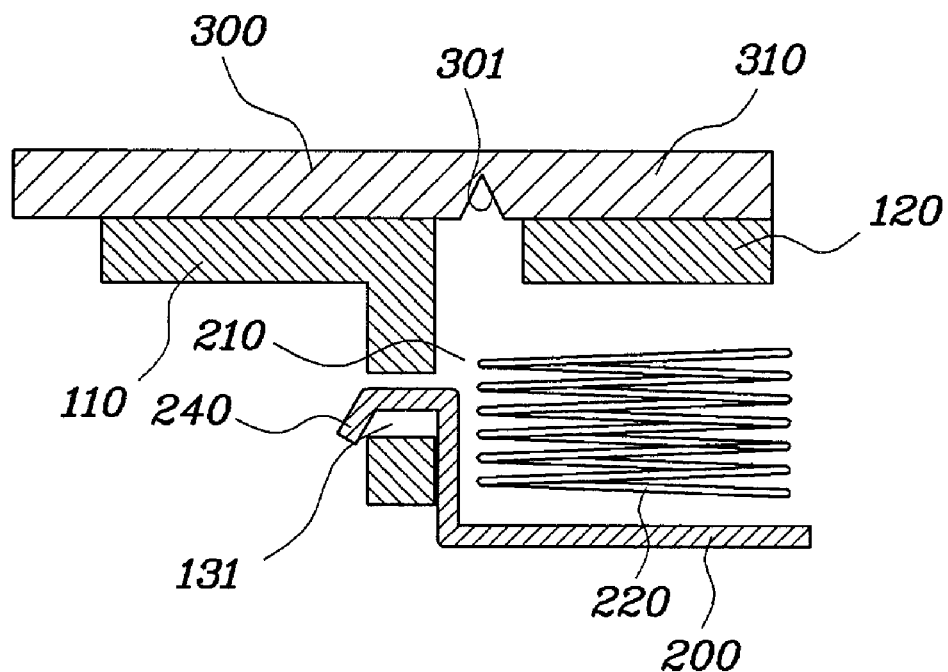
FIG. 4A is a view taken along line "C-C" of FIG. 3.
Figure 4B:
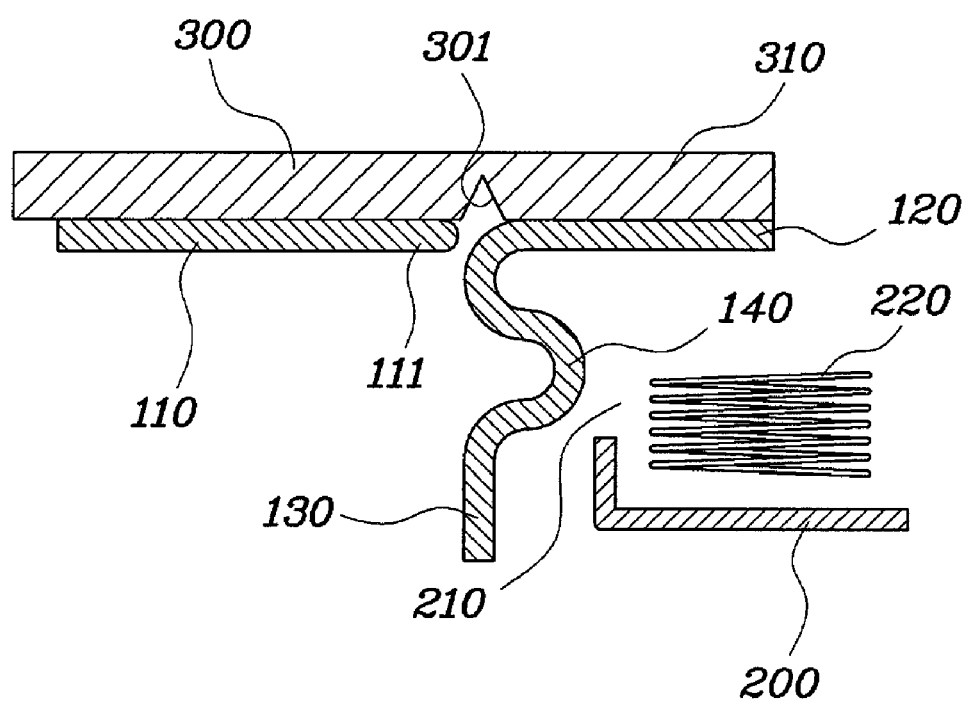
FIG. 4B is a view taken along line "D-D" of FIG. 3.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 1 to 4B, the airbag apparatus according to various embodiments of the present invention allows the hinge expanding direction of an airbag deployment door 310 relative to a crash pad cover 300 to correspond to the deploying direction of the airbag cushion when the airbag is deployed, thus realizing the rapid expansion of a hinge and minimizing the loss of pressure of the airbag cushion.

The airbag apparatus includes an airbag housing 200 which accommodates an airbag cushion 220 therein, an airbag deployment door 310 which separates from the crash pad cover 300 when the airbag cushion 220 deploys, and a chute 100 which is connected to a surface of the airbag deployment door 310 via a curved hinge portion 140.

The airbag housing 200 accommodates the folded airbag cushion 220 therein, and an opening 210 is defined in the upper portion of the airbag housing 200 such that the airbag cushion 220 is deployed through the opening 210. Further, a hook portion 240 protrudes from the sidewall 230 of the airbag housing 200 in such a way as to be inserted into the chute 100. The hook portion 240 is inserted and secured to the insert hole 131 of the chute 100 which will be described below.

The crash pad cover 300 includes the airbag deployment door 310 for deploying the airbag cushion 220. The airbag deployment door 310 is constructed to be separated through cut notches 301 which are formed in the back of the crash pad cover 300, when the airbag cushion 220 is deployed. The cut notches 301 are continuously or discontinuously formed along the edge of the airbag deployment door 310 such that the cut notches 301 are torn when the airbag cushion 220 is deployed.

Thus, when the airbag cushion 220 is deployed through the opening 210 of the airbag housing 200, the cut notches 301 are torn by the deploying pressure of the airbag cushion 220, so that the airbag deployment door 310 may separate from the crash pad cover 300.

A door reinforcing plate 120 is provided on the back of the airbag deployment door 310. The door reinforcing plate 120 is integrated with the chute 100. As such, since the door reinforcing plate 120 and the chute 100 are integrated into a single structure, the number of parts and manufacturing cost can be reduced.

The chute 100 is connected to a surface of the airbag deployment door 310 via the curved hinge portion 140. Here, the curved binge portion 140 is formed in a creased uneven shape and placed parallel to the sidewall 230 of the airbag housing 200.

Figure 5:
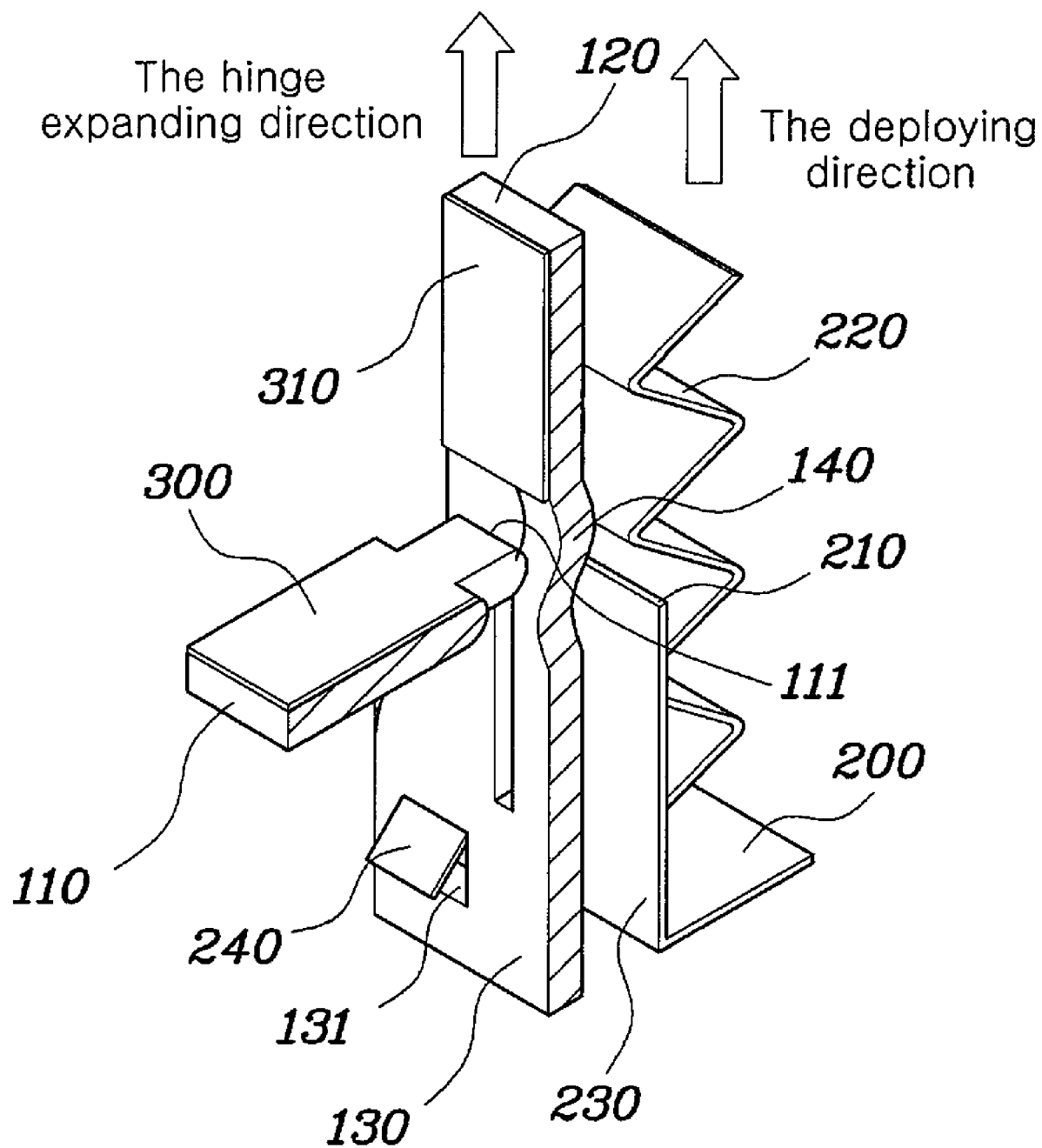
FIG. 5 is a view illustrating the state in which, when an airbag cushion is deployed, the chute of the airbag apparatus for vehicles is deployed in the airbag deploying direction.
Figure 6:
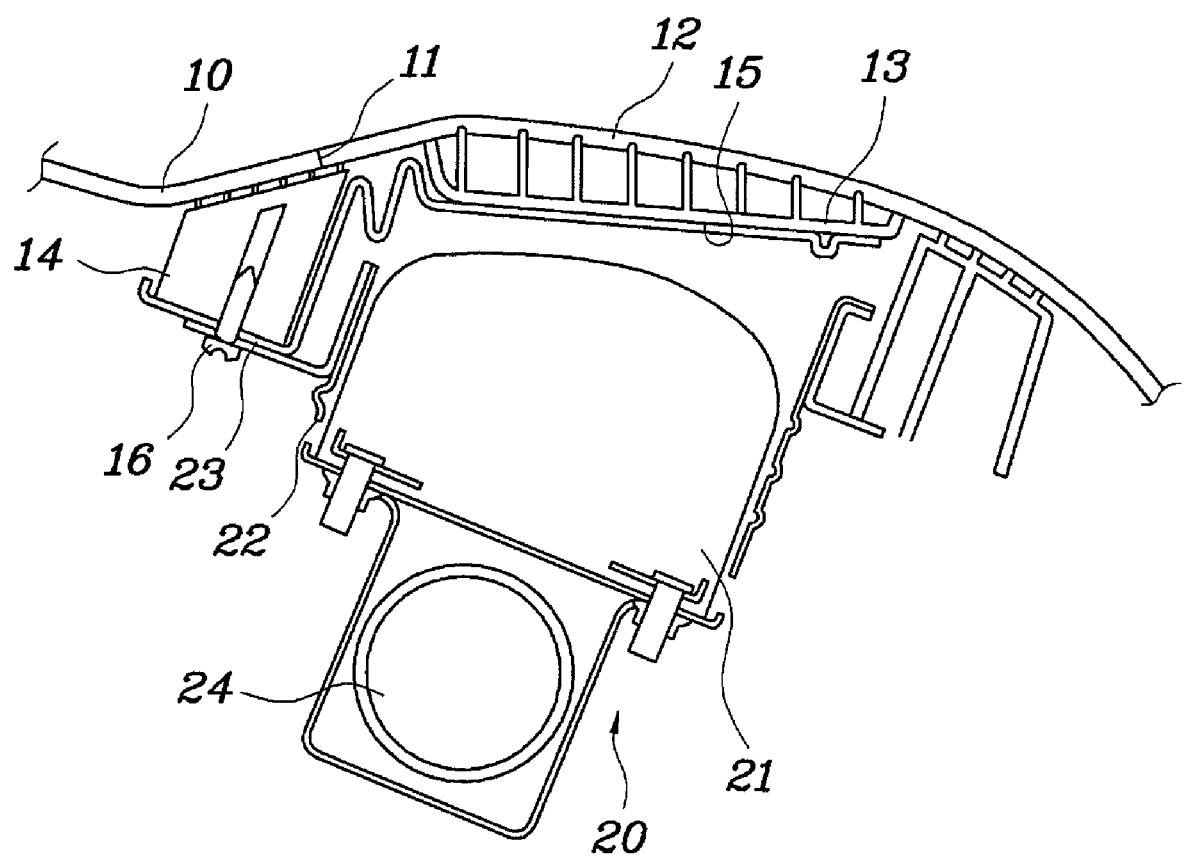
FIG. 6 is a view illustrating the construction of a conventional airbag apparatus for vehicles.
Figure 7A:
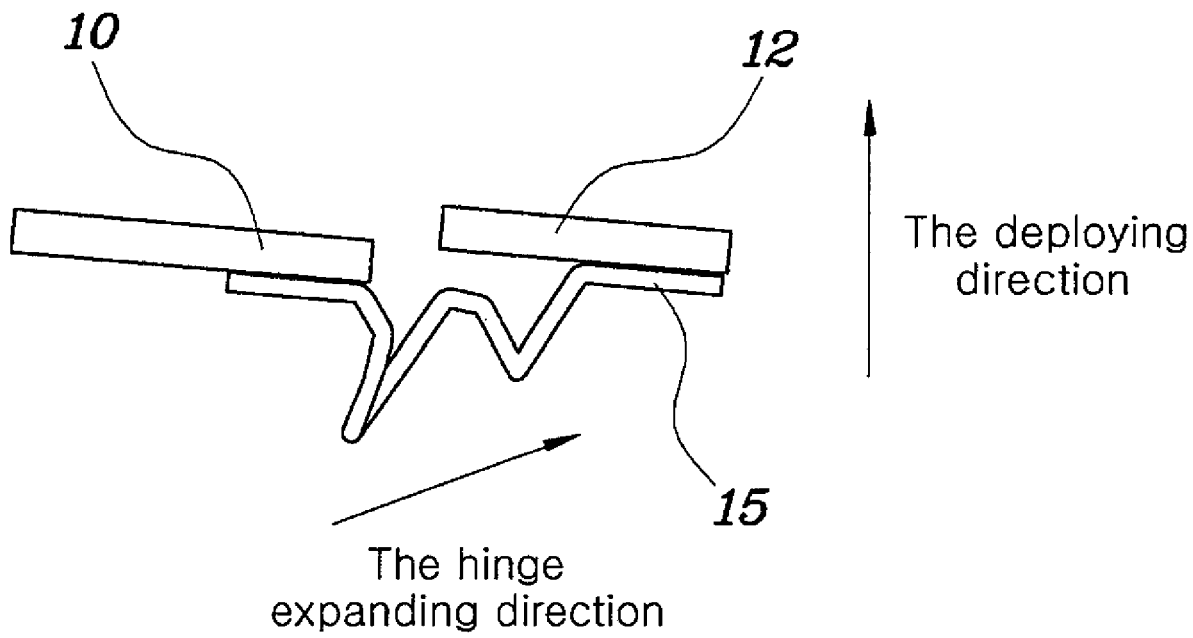
FIGS. 7A to 7D are schematic views illustrating the operation of a chute when a conventional airbag cushion is deployed.
Figure 7B:
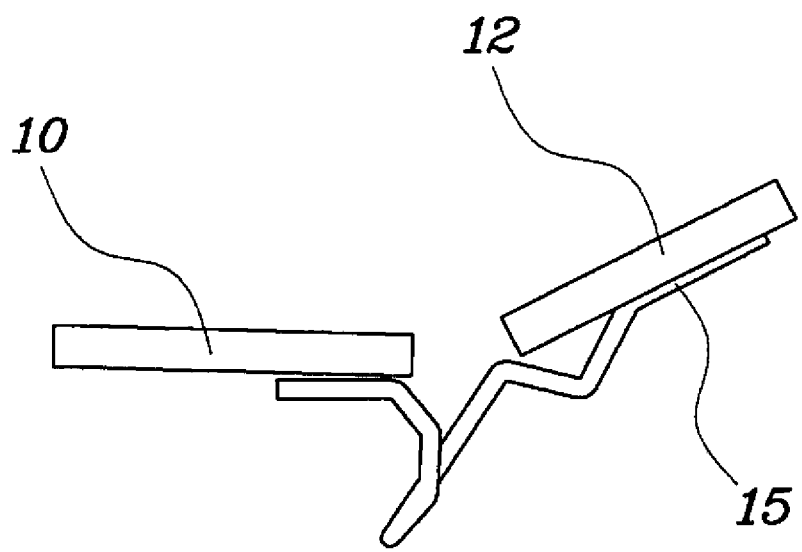
Figure 7C:
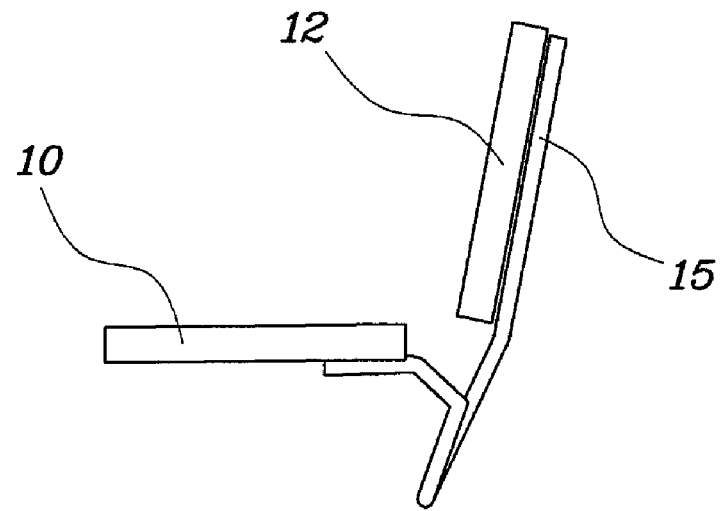
Figure 7D:
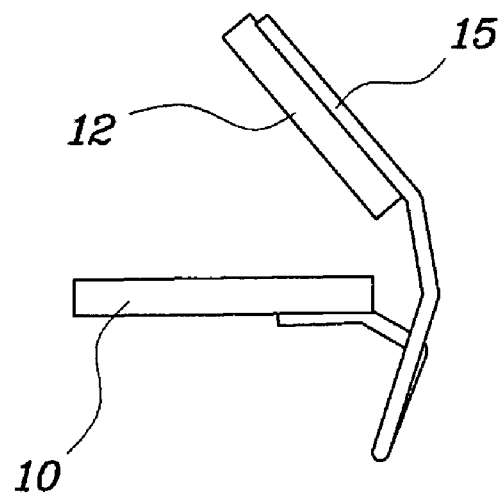

Thus, as shown in FIG. 5, when the airbag cushion 220 is deployed, the curved hinge portion 140 is straightened towards the front of the opening 210 by the deploying pressure of the airbag cushion 220, thus allowing the airbag deployment door 310 to be rotated at right angles.

Such a chute 100 includes the door reinforcing plate 120, a pad holding plate 110, and a support plate 130, which are integrally connected to each other.

The pad holding plate 110 has the shape of a plate which is attached to the back of the crash pad cover 300. The door reinforcing plate 120 has the shape of a plate which is attached to the back of the airbag deployment door 310. The support plate 130 is constructed to surround part of the sidewall 230 of the airbag housing 200.

Particularly, a predetermined portion of the support plate 130 is bent and connected to the pad holding plate 110, and a predetermined portion of the support plate 130 is connected to the door reinforcing plate 120 via the curved hinge portion 140. Preferably, the support plate 130 is alternately connected to the pad holding plate 110 and the curved hinge portion 140. Further, the insert hole 131 is formed in the support plate 130 so that the hook portion 240 of the airbag housing 200 is inserted and secured to the insert hole 131.

A stopper 111 is provided on the pad holding plate 110 to prevent the crash pad cover 300 from being torn in a bent direction when the hinge of the curved hinge portion 140 is expanded. An associated end of the stopper 111 is placed parallel to the cut notch 301.

As described above, the present invention provides an airbag apparatus for vehicles, which allows the deploying direction of the airbag cushion 220 to correspond to the hinge expanding direction of the airbag deployment door 310, thus realizing the rapid expansion of a hinge and minimizing the loss of the pressure of the airbag cushion when the airbag cushion is deployed. As a result, the present invention can solve the problem of the conventional airbag apparatus, in which the deploying direction of an airbag cushion is not identical with the expanding direction of the hinge of a hinge plate in the event of a vehicle collision, thus delaying the expansion of the hinge.

For convenience in explanation and accurate definition in the appended claims, the terms "upper", and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus for a vehicle, comprising:
   an airbag housing having an opening and retaining an airbag cushion therein, and through which the airbag cushion is configured to be deployed;
   an airbag deployment door placed to cover the opening, and separated from a crash pad cover when the airbag cushion is deployed;
   a chute connected to a surface of the airbag deployment door through a curved hinge portion which is placed adjacent to a sidewall of the airbag housing;
   a pad holding plate connected to the crash pad cover and the chute, but not connected to the curved hinge portion, wherein the pad holding plate secured to a back portion of the crash pad cover;
   a door reinforcing plate secured to a back portion of the airbag deployment door; and
   a support plate alternately connected to the pad holding plate and the door reinforcing plate;

wherein the curved hinge portion is formed in a creased shape, so that the curved hinge portion straightens in a forward direction of the opening when the airbag cushion is deployed, thus rotating the airbag deployment door to be approximately straight with a deploying direction of the airbag cushion; and wherein the pad holding plate is detached from the support plate when the airbag cushion is deployed.

2. The airbag apparatus as set forth in claim 1, wherein the deploying direction of the airbag cushion is identical with an expanding direction of the curved hinge portion.

3. The airbag apparatus as set forth in claim 1, wherein an insert hole is formed at a predetermined position in the support plate such that at least portion of the airbag housing is inserted and secured to the insert hole.

4. The airbag apparatus as set forth in claim 1, wherein a stopper is provided on the pad holding plate such that a lateral end of the stopper is placed parallel to a cut notch.

5. The airbag apparatus as set forth in claim 4, wherein the cut notch is formed in the back portion of the crash pad cover to be cut when the airbag cushion is deployed.

6. The airbag apparatus as set forth in claim 1, wherein the chute is integrated with the door reinforcing plate.

7. The airbag apparatus as set forth in claim 1, wherein the support plate surrounds at least a portion of the sidewall of the airbag housing.

8. The airbag apparatus as set forth in claim 1, wherein a cut notch is formed in a back portion of the crash pad cover to be cut when the airbag cushion is deployed.

* * * * *